(12) United States Patent
Ito et al.

(10) Patent No.: US 12,422,096 B2
(45) Date of Patent: Sep. 23, 2025

(54) LINER AND PRESSURE VESSEL

(71) Applicant: Mitsubishi Gas Chemical Company, Inc., Tokyo (JP)

(72) Inventors: Keisuke Ito, Hiratsuka (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 18/706,660

(22) PCT Filed: Sep. 1, 2022

(86) PCT No.: PCT/JP2022/032924
§ 371 (c)(1),
(2) Date: May 1, 2024

(87) PCT Pub. No.: WO2023/079823
PCT Pub. Date: May 11, 2023

(65) Prior Publication Data
US 2025/0012403 A1    Jan. 9, 2025

(30) Foreign Application Priority Data
Nov. 5, 2021 (JP) ................ 2021-180979

(51) Int. Cl.
  *F17C 1/06* (2006.01)
  *C08G 69/26* (2006.01)
  *C08L 77/06* (2006.01)

(52) U.S. Cl.
  CPC .......... *F17C 1/06* (2013.01); *C08G 69/26* (2013.01); *C08L 77/06* (2013.01); *F17C 2203/0604* (2013.01)

(58) Field of Classification Search
  CPC ...... F17C 1/06; F17C 1/04; F17C 1/02; F17C 2203/0604; C08G 69/26; C08G 69/625; C08L 77/06
  (Continued)

(56) References Cited

U.S. PATENT DOCUMENTS

2009/0203845 A1*  8/2009  Fukui ............... B29C 45/006
                                                          525/190
2011/0108557 A1*  5/2011  Tani ....................... F17C 1/16
                                                          220/586
(Continued)

FOREIGN PATENT DOCUMENTS

EP    3225888 A1    10/2017
EP    3385074 A1 *  10/2018   ........... B32B 1/08
(Continued)

OTHER PUBLICATIONS

Extended European Search Report issued in corresponding European Patent Application No. 22889648.6; Jan. 29, 2025; 9 pages.
(Continued)

*Primary Examiner* — Javier A Pagan
(74) *Attorney, Agent, or Firm* — Fitch, Even, Tabin & Flannery LLP

(57) ABSTRACT

To provide a liner which contains a polyamide resin, wherein the polyamide resin contains a diamine-derived structural unit and a dicarboxylic acid-derived structural unit; 50 mol % or more of the diamine-derived structural unit is derived from a xylylenediamine; a content of a toughness improver in a region up to 30% in a thickness direction from one surface of the liner is from 5 to 20 mass %; and a content of the toughness improver in a region up to 30% in a thickness direction from the other surface of the liner is 0.5 mass % or less.

19 Claims, 3 Drawing Sheets

(58) Field of Classification Search
USPC .............. 220/901, 581–592, 560.04–560.15
See application file for complete search history.

(56) References Cited

U.S. PATENT DOCUMENTS

2014/0008373 A1* 1/2014 Sharp ....................... F17C 1/16
   220/586
2017/0343158 A1* 11/2017 Kato ......................... F17C 1/06

FOREIGN PATENT DOCUMENTS

| | | |
|---|---|---|
| JP | 2009191871 A | 8/2009 |
| JP | 2014501818 A | 1/2014 |
| JP | 2020117637 A | 8/2020 |
| JP | 2021075047 A | 5/2021 |
| JP | 2021095943 A | 6/2021 |
| WO | 2012076677 A2 | 6/2012 |
| WO | 2016084475 A1 | 6/2016 |

OTHER PUBLICATIONS

International Search Report issued in PCT/JP2022/032924, mailed Oct. 18, 2022.
International Preliminary Report of Patentability and Written Opinion issued in PCT/JP2022/032924, mailed Oct. 18, 2022.

* cited by examiner

LINER AND PRESSURE VESSEL

CROSS-REFERENCE TO RELATED APPLICATIONS

This application is a U.S. national phase application filed under 35 U.S.C. § 371 of International Application Number PCT/JP2022/032924 filed Sep. 1, 2022, designating the United States, which claims priority from Japanese Application Number 2021-180979, filed Nov. 5, 2021.

FIELD OF THE INVENTION

The present invention relates to a liner and a pressure vessel.

BACKGROUND OF THE INVENTION

A pressure vessel having excellent gas barrier properties has been used for retaining gas components such as hydrogen, oxygen, carbon dioxide, nitrogen, argon, liquefied petroleum gas (LPG), chlorofluorocarbon substitutes, and methane for a long period of time. Particularly, in recent years, a pressure vessel formed of a polyamide resin as a raw material has been studied.

For example, Patent Document 1 describes a hollow molded article (hydrogen tank liner) that does not cause defects even when filling and pressure discharge of high-pressure hydrogen are repeated. Specifically, the patent document describes a hollow molded article that comes into contact with high-pressure hydrogen, wherein the hollow molded article has an average crystallinity of 15% or more in a region up to 100 μm in a depth direction from the outer surface of the hollow molded article and an average crystallinity of 15% or more in a region up to 100 μm in a depth direction from the inner surface of the hollow molded article. Further, Patent Document 1 describes that the hollow molded article is made of a polyamide resin composition.

Patent Document 2 describes a pressure vessel having a liner and an outer layer of the liner, wherein the outer layer is composed of a composite material containing continuous fibers and a polyamide resin with which the continuous fibers are impregnated, wherein the polyamide resin contains a diamine-derived structural unit and a dicarboxylic acid-derived structural unit, and wherein 50 mol % or more of the diamine-derived structural unit is derived from xylylenediamine.

CITATION LIST

Patent Documents

Patent Document 1: JP 2021-075047 A
Patent Document 2: WO 2016/084475

SUMMARY OF INVENTION

As described above, the pressure vessel formed of a polyamide resin as a raw material has been studied. As the pressure vessel formed of a polyamide resin as a raw material has been studied, and a demand therefor has been increased, a higher-performance pressure vessel formed of a polyamide resin as a raw material has been required. Such high performance is required for, for example, suppression of collapse in a pressure vessel formed of a polyamide resin as a raw material. For example, in the case where a body of the pressure vessel includes a liner containing a polyamide resin and an outer layer, collapse occurs when the liner is dented inward. In a hydrogen gas pressure vessel, the liner and its interior are depressurized during use, but a very small gap between the liner and the outer layer is not depressurized. Therefore, the liner of the pressure vessel is dented inward due to the pressure in the gap, resulting in occurrence of collapse.

For eliminating such an inward dent of the liner, the liner is required to sufficiently maintain its shape at the time of depressurization of the liner. Further, the pressure vessel is naturally required to have pressure resistance and gas barrier properties.

An object of the present invention is to solve such problems, and to provide a liner capable of sufficiently maintaining its shape at the time of depressurization and having excellent pressure resistance and gas barrier properties, and a pressure vessel including the liner.

Solution to Problem

As a result of investigations made by the present inventor in view of the above problems, it has been found that, in a liner containing a polyamide resin, the occurrence of collapse is suppressed by providing a region where a toughness improver is present in a thickness direction of the liner, and further that a liner having excellent pressure resistance and gas barrier properties can be obtained by closely examining the amount of the toughness improver to be blended and the type of the polyamide resin.

Specifically, the issues described above are solved by the followings.

<1> A liner containing a polyamide resin, wherein
the polyamide resin contains a diamine-derived structural unit and a dicarboxylic acid-derived structural unit,
50 mol % or more of the diamine-derived structural unit is derived from a xylylenediamine,
a content of a toughness improver in a region up to 30% in a thickness direction from one surface of the liner is from 5 to 20 mass %, and
a content of the toughness improver in a region up to 30% in a thickness direction from the other surface of the liner is 0.5 mass % or less.

<2> The liner according to <1>, wherein 50 mol % or more of the dicarboxylic acid-derived structural unit is derived from an α,ω-linear aliphatic dicarboxylic acid having from 4 to 20 carbons.

<3> The liner according to <1> or <2>, wherein the toughness improver contains a carboxylic acid-modified polyolefin.

<4> The liner according to <3>, wherein a carboxylic acid modification rate of the carboxylic acid-modified polyolefin is from 0.1 to 5.0 mass %.

<5> A pressure vessel including the liner described in any one of <1> to <4> and an outer layer of the liner.

<6> The pressure vessel according to <5>, wherein the region of the liner in which the content of the toughness improver is from 5 to 20 mass % is provided at an inner side of the pressure vessel.

<7> The pressure vessel according to <5>, wherein the region of the liner in which the content of the toughness improver is from 5 to 20 mass % is provided at an outer side of the pressure vessel.

<8> The pressure vessel according to any one of <5> to <7>, wherein the outer layer contains a fiber-reinforced plastic layer.

<9> The pressure vessel according to <8>, wherein the fiber-reinforced plastic layer contains a thermosetting resin.

<10> The pressure vessel according to <8> or <9>, wherein the outer layer which is the fiber-reinforced plastic layer is adjacent to the region of the liner in which the content of the toughness improver is 0.5 mass % or less.

<11> The pressure vessel according to any one of <5> to <10>, which is for a hydrogen gas.

<12> The pressure vessel according to any one of <5> to <10>, which is for an oxygen gas.

The present invention has made it possible to provide a liner capable of sufficiently maintaining its shape at the time of depressurization and having excellent pressure resistance and gas barrier properties, and a pressure vessel including the liner.

DESCRIPTION OF EMBODIMENTS

Figure 1:
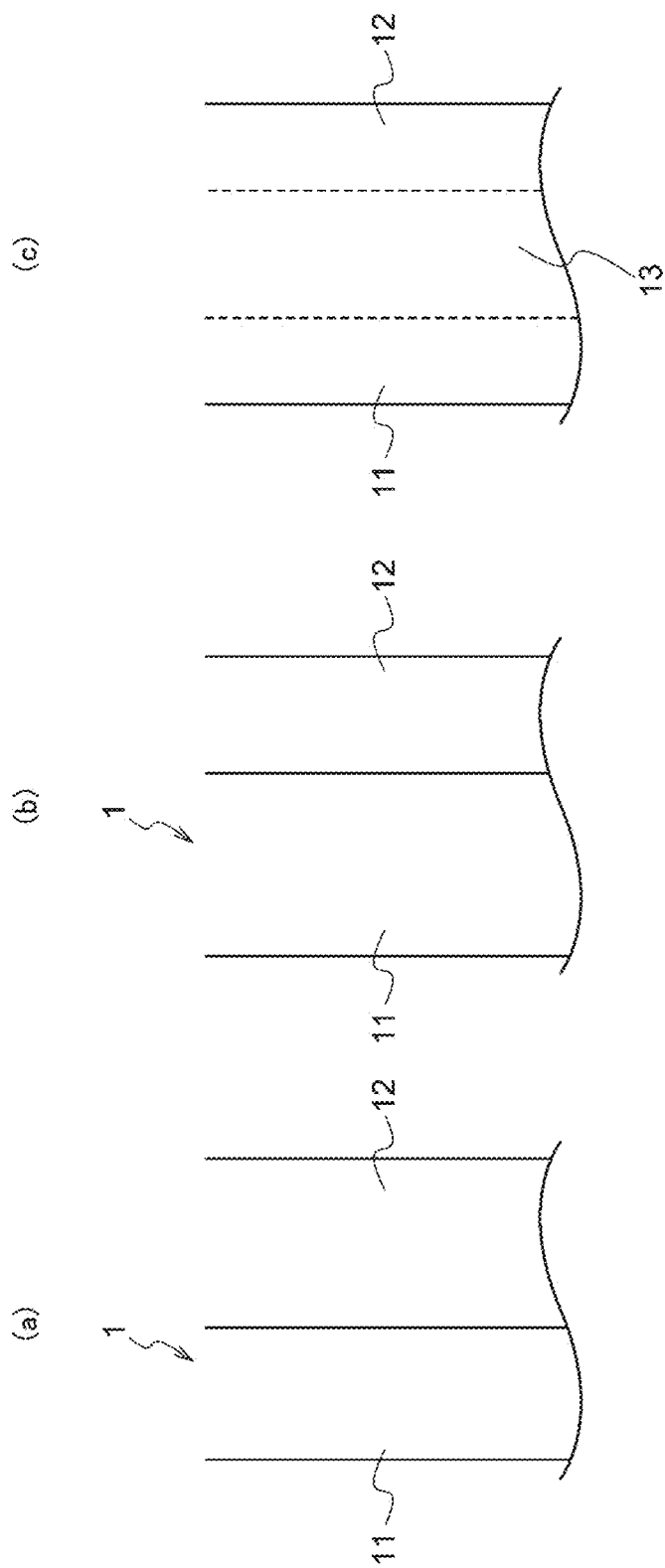
FIG. 1 is a cross-sectional schematic view illustrating a layer configuration of a liner of the present embodiment.

Embodiments for carrying out the present invention (hereinafter referred to simply as "the present embodiment") will next be described in detail. The present embodiment described below is an example for describing the present invention, and the present invention is not limited only to the present embodiment.

In the present specification, numerical values described before and after the term "to" are respectively the lower limit and the upper limit of a range including the numerical values.

In the present specification, various physical property values and characteristic values are those at 23° C. unless otherwise noted.

The term "layer" in the present specification may be a single layer or a plurality of layers.

When a measurement method described in a standard set forth in the present specification differs depending on the year, it is based on the standard as of Jan. 1, 2021 unless otherwise stated.

The liner of the present embodiment is a liner containing a polyamide resin, characterized in that the polyamide resin contains a diamine-derived structural unit and a dicarboxylic acid-derived structural unit; 50 mol % or more of the diamine-derived structural unit is derived from a xylylenediamine; a content of a toughness improver in a region up to 30% in a thickness direction from one surface of the liner is from 5 to 20 mass %; and a content of the toughness improver in a region up to 30% in a thickness direction from the other surface of the liner is 0.5 mass % or less.

Such a configuration makes it possible to provide a liner capable of sufficiently maintaining its shape at the time of depressurization and having excellent pressure resistance and gas barrier properties.

When a resin-made liner is used in a pressure vessel, an outer layer is generally provided for reinforcement. As the outer layer, for example, a fiber-reinforced plastic such as UD tape may be wound around an outer periphery of the liner. However, as a result of studies conducted by the present inventor, it has been found that such a liner and its outer layer are adjacent to each other, but strictly not in close contact with each other. Therefore, a gas component to be stored may enter a very small gap between the liner and the outer layer. For example, it has been found that, in the case of a pressure vessel for hydrogen gas, the liner portion is depressurized during use, but the gap between the liner and the outer layer is not depressurized, and thus the liner may be dented inward by a pressure in the gap. Therefore, the present inventors have studied to blend a toughness improver into a liner containing a polyamide resin. By blending the toughness improver, toughness was imparted to the liner, the occurrence of collapse was suppressed (that is, a shape maintenance rate was also increased), and excellent pressure resistance was achieved. However, it has been found that the gas barrier properties of the liner are deteriorated when the toughness improver is blended into the liner. Therefore, in the present embodiment, it has been studied to enhance the gas barrier properties by using a xylylenediamine-based polyamide resin having excellent gas barrier properties as the polyamide resin. However, even if the xylylenediamine-based polyamide resin is used, the gas barrier properties are not necessarily sufficient when the toughness improver is blended. Therefore, in the present embodiment, this problem has been solved by providing a region containing a certain amount of the toughness improver and a region containing little or no toughness improver in a thickness direction of the liner. Furthermore, in the present embodiment, both the region containing the toughness improver and the region containing almost no toughness improver contain the xylylenediamine-based polyamide resin, and thus interfacial peeling (blistering) is less likely to occur, and the occurrence of collapse can be more effectively suppressed. The xylylenediamine-based polyamide resin refers to a polyamide resin containing a diamine-derived structural unit and a dicarboxylic acid-derived structural unit, wherein 50 mol % or more of the diamine-derived structural unit is derived from a xylylenediamine.

The details of the present embodiment will be described below.

Next, a layer configuration of the liner of the present embodiment will be described with reference to FIG. 1.

FIG. 1 is a schematic view illustrating a state of a cross section of a liner of the present embodiment, in which 1 denotes the liner, 11 denotes a region in which a content of a toughness improver is from 5 to 20 mass % (hereinafter may be referred to as "region 11"), 12 denotes a region in which the content of the toughness improver is 0.5 mass % or less (hereinafter may be referred to as "region 12"), and 13 is an optional region.

FIG. 1(a) is a first example of a layer configuration of the liner. In FIG. 1(a), the region 11 in which the content of the toughness improver is from 5 to 20 mass % is adjacent to the region 12 in which the content of the toughness improver is 0.5 mass % or less. With such a configuration, the region 11 having a higher content of the toughness improver mainly effectively contributes to shape maintenance, and the region 12 having a lower content of the toughness improver mainly effectively contributes to an improvement in gas barrier properties. Furthermore, in the layer configuration of FIG. 1(a), the region 11 and the region 12 are in contact with each other, and thus the close contact therebetween is high, and it is possible to prevent the occurrence of blistering.

In the liner of the present embodiment, the region 11 may be present at least in a region up to 30% in a thickness direction from one surface of the liner. That is, the region 11 accounts for 30% or more of an overall thickness of the liner. However, as illustrated in FIG. 1(b), in the liner of the present embodiment, a thickness proportion of the region 11 may be higher. By increasing the proportion of the region 11, there is a tendency that a pressure vessel having more excellent shape maintainability can be obtained. The proportion of the region 11 may be 35% or more, 40% or more, 45% or more, 50% or more, 55% or more, 60% or more, or 65% or more, and 70% or less, 65% or less, 60% or less, 55% or less, 50% or less, 45% or less, 40% or less, or 35% or less from one surface of the liner in the thickness direction.

In the present embodiment, the region 11 may include only one layer, or may include two or more layers. When the region 11 includes two or more layers, the total thickness of the layers preferably accounts for the proportion described above.

An example in which the region 11 includes two layers is a case where the content of the toughness improver is in a range of from 5 to 20 mass %, and the region 11 includes a region containing a larger amount of the toughness improver and a region containing a smaller amount of the toughness improver. In addition, in the region 11, the content of the toughness improver may be highest at the outermost surface and gradually decrease in the thickness direction.

The content of the toughness improver in the region 11 is 5 mass % or more, preferably 6 mass % or more, more preferably 8 mass % or more, even more preferably 10 mass % or more, and still more preferably 12 mass % or more, relative to the total mass of the region 11. The content of the toughness improver in the region 11 is 20 mass % or less, preferably 18 mass % or less, and more preferably 16 mass % or less, relative to that in the region 11 having a large amount of the toughness improver.

The region 11 may contain only one type of toughness improver, or two or more types thereof. When two or more types of toughness improvers are contained, the total amount thereof preferably falls within the above range.

In addition, the content of the toughness improver in the region 11 is not necessarily constant throughout the entire region 11 as described above, and the content may vary within a range of from 5 to 20 mass %. When the content of the toughness improver is not constant throughout the entire region 11, an average content of the toughness improver in the region 11 preferably satisfies the above proportion.

In addition, the region 12 in which the content of the toughness improver is 0.5 mass % or less may be present at least in a region up to 30% in a thickness direction from the other surface (the surface on the side opposite to the region 11) of the liner. That is, the region 12 accounts for 30% or more of the overall thickness of the liner. However, the thickness proportion of the region 12 may be higher. By increasing the proportion of the region 12, there is a tendency that a pressure vessel having more excellent barrier properties can be obtained. The proportion of the region 12 may be 35% or more, 40% or more, 45% or more, 50% or more, 55% or more, 60% or more, or 65% or more, and 70% or less, 65% or less, 60% or less, 55% or less, 50% or less, 45% or less, 40% or less, or 35% or less from one surface of the liner in the thickness direction.

In the present embodiment, the region 12 may include only one layer, or may include two or more layers. When the region 12 includes two or more layers, the total thickness of the layers preferably accounts for the proportion described above.

An example in which the region 12 includes two layers is a case where the content of the toughness improver is in a range of less than 0.5 mass %, and the region 12 includes a region containing a larger amount of the toughness improver and a region containing a smaller or no amount of the toughness improver. In addition, in the region 12, the content of the toughness improver may be lowest at the outermost surface and gradually increase in the thickness direction.

The content of the toughness improver in the region 12 is 0.5 mass % or less, preferably 0.4 mass % or less, more preferably 0.3 mass % or less, even more preferably 0.2 mass % or less, and still more preferably 0.1 mass % or less, relative to the total mass of the region 12. The lower limit of the content of the toughness improver in the region 12 is 0 mass %.

The region 12 may be free of the toughness improver, may contain only one type of toughness improver, or may contain two or more types thereof. When two or more types of toughness improvers are contained, the total amount thereof preferably falls within the above range.

The content of the toughness improver in the region 12 is not necessarily constant throughout the entire region 12 as described above, and the content may vary within a range of less than 5 mass %. When the content of the toughness improver is not constant throughout the entire region 12, an average content of the toughness improver in the region 12 preferably satisfies the above proportion.

In addition, for example, as illustrated in FIG. 1(c), an optional region 13 which corresponds to neither the region 11 nor the region 12 may be included between the region 11 and the region 12.

The region 13 is a part or the whole of a region more than 30% and less than 70% in the thickness direction from one surface of the liner. One example of the optional region 13 is a region in which the content of the toughness improver is less than 0.5 mass % and which contains a xylylenediamine-based polyamide resin. Another example of the region 13 is a region in which the content of the toughness improver is more than 0.5 mass % and less than 5 mass % and which contains a xylylenediamine-based polyamide resin. Still another example of the region 13 is a region in which the content of the toughness improver is more than 20 mass % and which contains a xylylenediamine-based polyamide resin. In particular, when the optional region 13 is present in the liner of the present embodiment, the region 13 is preferably a region in which the content of the toughness improver is more than 0.5 mass % and less than 5 mass % and which contains a xylylenediamine-based polyamide resin. Furthermore, an aspect in which the content of the toughness improver decreases stepwise in the order of the region 11, the region 13, and the region 12 is also preferred.

In the present embodiment, the total thickness of the region 11 and the region 12 preferably accounts for 80% or more, more preferably 85% or more, even more preferably 90% or more, still more preferably 95% or more, and even still more preferably 98% or more of the overall thickness of the liner.

More specifically, in the present embodiment, it is preferable that the region 11 and the region 12 be in contact with each other, or the region 11, the region 13, and the region 12 be in contact with one another, and the content of the toughness improver in the region 13 be more than 0.5 mass % and less than 5 mass %, and it is more preferable that the region 11 and the region 12 be in contact with each other (the region 13 be absent).

In addition, the components other than the toughness improver are preferably 90 mass % or more common, more preferably 95 mass % or more common, and even more preferably 99 mass % or more common in the compositions of the region 11 and the region 12. In addition, when the liner of the present embodiment has the region 13, the components other than the toughness improver are preferably 90 mass % or more common, more preferably 95 mass % or more common, and even more preferably 99 mass % or more common in the compositions of the region 11, the region 13, and the region 12.

The overall thickness of the liner of the present embodiment is preferably 500 μm or more, more preferably 800 μm or more, and even more preferably 1000 μm or more. When the overall thickness is the lower limit value or more, the gas barrier properties tend to be further improved. Furthermore, the overall thickness of the liner is preferably 3000 μm or less, more preferably 2500 μm or less, and even more preferably 2000 μm or less. When the overall thickness is the upper limit value or less, lightweight properties tend to be improved.

Next, the xylylenediamine-based polyamide resin contained in the liner will be described.

The xylylenediamine-based polyamide resin used in the present embodiment contains a diamine-derived structural unit and a dicarboxylic acid-derived structural unit, and 50 mol % or more of the diamine-derived structural unit is derived from a xylylenediamine. The use of such a xylylenediamine-based polyamide resin achieves a liner and a pressure vessel having excellent gas barrier properties.

Of the diamine-derived structural unit of the xylylenediamine-based polyamide resin, preferably 70 mol % or more, more preferably 80 mol % or more, even more preferably 90 mol % or more, still more preferably 95 mol % or more, and even still more preferably 98 mol % or more is derived from a xylylenediamine.

The xylylenediamine used is preferably m-xylylenediamine and/or p-xylylenediamine. In the present embodiment, the xylylenediamine is preferably only m-xylylenediamine or a mixture (copolymer) of m-xylylenediamine and p-xylylenediamine, and is more preferably m-xylylenediamine.

A mole ratio of m-xylylenediamine to p-xylylenediamine in the xylylenediamine is preferably from 100:0 to 10:90, more preferably from 100:0 to 30:70, even more preferably from 100:0 to 50:50, still more preferably from 100:0 to 60:40, even still more preferably from 100:0 to 90:10, and yet even still more preferably from 100:0 to 95:5.

Examples of the diamine besides xylylenediamine that can be used as a raw material diamine component of the xylylenediamine-based polyamide resin include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl) methane, 2,2-bis(4-aminocyclohexyl) propane, bis(aminomethyl) decalin, and bis(aminomethyl)tricyclodecane; and diamines having an aromatic ring, such as bis(4-aminophenyl) ether, p-phenylenediamine, and bis(aminomethyl) naphthalene. One type thereof can be used, or two or more types thereof can be mixed and used.

Preferably 50 mol % or more, more preferably 70 mol % or more, even more preferably 80 mol % or more, still more preferably 90 mol % or more, even still more preferably 95 mol % or more, and yet even still more preferably 98 mol % or more of the dicarboxylic acid-derived structural unit of the xylylenediamine-based polyamide resin is derived from an α,ω-linear aliphatic dicarboxylic acid having from 4 to 20 carbons.

The α,ω-linear aliphatic dicarboxylic acid having from 4 to 20 carbons is preferably an α,ω-linear aliphatic dicarboxylic acid having from 4 to 14 carbons, and more preferably a structural unit derived from an α,ω-linear aliphatic dicarboxylic acid having from 6 to 9 carbons. Specific examples of the α,ω-linear aliphatic dicarboxylic acid having from 4 to 20 carbons include aliphatic dicarboxylic acids such as succinic acid, glutaric acid, pimelic acid, suberic acid, azelaic acid, adipic acid, sebacic acid, undecanedioic acid, and dodecanedioic acid, and one type thereof can be used, or two or more types thereof can be mixed and used. Among these, adipic acid or sebacic acid is preferred, and adipic acid is particularly preferred.

Examples of dicarboxylic acid components other than the α,ω-linear aliphatic dicarboxylic acid having from 4 to 20 carbons include phthalic acid compounds, such as isophthalic acid, terephthalic acid, and orthophthalic acid; and naphthalenedicarboxylic acids, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid.

Among these dicarboxylic acid components, one type thereof can be used, or two or more types thereof can be mixed and used.

The xylylenediamine-based polyamide resin used in the present embodiment normally contains a diamine-derived structural unit and a dicarboxylic acid-derived structural unit as main components, but a case where a structural unit other than these is contained is not excluded, and, needless to say, the xylylenediamine-based polyamide resin may contain a structural unit derived from a lactam such as ε-caprolactam or laurolactam, or from an aliphatic aminocarboxylic acid such as aminocaproic acid or aminoundecanoic acid. As used herein, the term "main components" indicates that, of the structural units constituting the xylylenediamine-based polyamide resin, the total number of the diamine-derived structural units and the dicarboxylic acid-derived structural units is the largest among all the structural units. In the present embodiment, the total of the diamine-derived structural unit and the dicarboxylic acid-derived structural unit in the xylylenediamine-based polyamide resin preferably accounts for 90.0 mass % or more, more preferably 95.0 mass % or more, and even more preferably 98.0 mass % or more of all the structural units, and still more preferably 99.0 mass % or more of all the structural units excluding terminal structures.

A melting point of the xylylenediamine-based polyamide resin used in the present embodiment is preferably 200° C. or higher and preferably 300° C. or lower. When such a xylylenediamine-based polyamide resin is used, the mechanical strength of the resulting pressure vessel tends to be further improved.

The melting point can be measured according to the description in paragraph of WO 2016/084475, the content of which is incorporated herein by reference.

The lower limit of a number average molecular weight (Mn) of the xylylenediamine-based polyamide resin used in the present embodiment is preferably 6000 or more, more preferably 8000 or more, even more preferably 10000 or more, still more preferably 15000 or more, and even still more preferably 20000 or more. The upper limit of the above Mn is preferably 35000 or less, more preferably 30000 or less, and even more preferably 28000 or less.

The number average molecular weight can be measured according to the description in paragraph of WO 2016/084475, the content of which is incorporated herein by reference.

The content of the xylylenediamine-based polyamide resin in the liner of the present embodiment is preferably 85 mass % or more, more preferably 90 mass % or more, and even more preferably 95 mass % or more, and may be 98 mass % or more relative to the total mass of components other than the toughness improver among the components constituting the liner. When the content is the lower limit value or more, the gas barrier properties tend to be further improved. The upper limit of the content of the xylylenediamine-based polyamide resin is 100 mass % or less relative to the total mass of components other than the toughness improver among the components constituting the liner.

The liner of the present embodiment may contain only one type of xylylenediamine-based polyamide resin or may contain two or more types thereof. When two or more types of xylylenediamine-based polyamide resins are contained, the total amount thereof preferably falls within the above range.

Next, details of the toughness improver will be described.

The liner of the present embodiment contains a toughness improver. The type of the toughness improver is not particularly limited as long as it improves the toughness of the liner, and a toughness improver having a flexural modulus of 500 MPa or less as measured in accordance with ASTM D-790 is widely used. The lower limit value of the flexural modulus is preferably 0 MPa or more.

Specifically, the toughness improver is preferably an acid-modified polyolefin, an ionomer, or an aromatic vinyl compound/conjugated diene compound-based block copolymer, more preferably an acid-modified polyolefin, and even more preferably a carboxylic acid-modified polyolefin. When an acid-modified polyolefin, particularly a carboxylic acid-modified polyolefin is used, the polyolefin interacts with an amino group or a carboxyl group of the polyamide resin, and the polyolefin is easily finely dispersed in the polyamide resin.

Examples of the polyolefin include a copolymer of ethylene and an α-olefin having 3 or more carbons and a copolymer of propylene and an α-olefin having 4 or more carbons. Among them, a copolymer of ethylene and an α-olefin having 3 or more carbons is preferred, and an ethylene-butene copolymer is more preferred.

Examples of the α-olefin having 3 or more carbons include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. One of these can be used alone, or two or more thereof can be used.

The polyolefin may be copolymerized with a polyene of a non-conjugated diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, or 2-propenyl-2,5-norbornadiene. One of these can be used alone, or two or more thereof can be used.

The acid-modified polyolefin is preferably a polymer obtained by copolymerizing an olefin with an α,β-unsaturated carboxylic acid and/or an unsaturated carboxylic acid ester monomer. Examples of the α,β-unsaturated carboxylic acid monomer include acrylic acid and methacrylic acid, and examples of the α,β-unsaturated carboxylic acid ester monomer include methyl ester, ethyl ester, propyl ester, butyl ester, pentyl ester, hexyl ester, heptyl ester, octyl ester, nonyl ester, and decyl ester of these unsaturated carboxylic acids. One of these can be used alone, or two or more thereof can be used.

The acid (carboxylic acid) modification rate in the acid-modified polyolefin (preferably carboxylic acid-modified polyolefin) is preferably 0.1 mass % or more, more preferably 0.5 mass % or more, and even more preferably 1.0 mass % or more, and is preferably 5.0 mass % or less, more preferably 4.0 mass % or less, and even more preferably 3.0 mass % or less. When the acid modification rate falls within such a range, the polyolefin interacts with an amino group or a carboxyl group of the polyamide resin, and the polyolefin is easily finely dispersed in the polyamide resin. The acid modification rate is a value measured according to the following method.

Measurement of Acid Modification Rate

To 0.15 g of a sample (acid-modified polyolefin) was added 30 mL of xylene, and the mixture was heated at 100° C. for dissolution of the sample. After dissolution of the sample, 2 mL of ethanol and an indicator (phenolphthalein liquid) were added to the solution, and neutralization titration was performed using a 0.1 N methanol solution of potassium hydroxide as a titrant. A blank was obtained by performing titration in the same manner as described above except for no addition of a sample, and the modification rate by the acid derivative was calculated from the following formula:

$$\text{Modification rate (mass \%) by acid derivative} = \{[(A-B) \times f \times 100]/(C \times 2 \times 1000000 \times D)\} \times 100$$

(A: titration amount (mL), B: blank titration amount (mL), f: factor of titrant, C: sample amount (g), D: molecular weight of acid derivative unit).

The factor f of the titrant used above is 1.005.

In addition to the above toughness improver, the present embodiment may involve the use of a toughness improver described in paragraphs 0048 to 0060 of JP 2020-073323 A or paragraphs 0019 to 0023 of WO 2015/022818, the contents of which are incorporated herein by reference.

In addition, the region 11 and the region 12 may contain the same toughness improver or may contain different toughness improvers.

In addition, the liner of the present embodiment may contain an additional component other than the xylylenediamine-based polyamide resin and the toughness improver.

Examples of the additional component include polyamide resins other than the xylylenediamine-based polyamide resin, thermoplastic resins other than the polyamide resin and other than the toughness improver, resin additives, and fillers.

Examples of the polyamide resins other than the xylylenediamine-based polyamide resin include polyamide 66, polyamide 6, polyamide 46, polyamide 6/66, polyamide 10, polyamide 612, polyamide 11, polyamide 12, polyamide 66/6T composed of hexamethylenediamine, adipic acid, and terephthalic acid, and polyamide 6I/6T composed of hexamethylenediamine, isophthalic acid, and terephthalic acid. When any other resin is blended, at least one type of polyamide 66 and polyamide 6 is preferred, and polyamide 66 is more preferably contained.

The other polyamide resins used may be, besides the above ones, polyamide resins described in paragraphs 0017 to 0047 of JP 2020-073323 A and paragraph 0018 of WO 2015/022818, the contents of which are incorporated herein by reference.

A content (mass ratio) of the xylylenediamine-based polyamide resin to the other polyamide resins in the liner of the present embodiment is preferably 50 to 100:50 to 0, more preferably 80 to 100:20 to 0, even more preferably 90 to 100:10 to 0, and particularly preferably 99 to 100:1 to 0. The liner of the present embodiment may contain only one type of polyamide resin or may contain two or more types of polyamide resins, other than the xylylenediamine-based polyamide resin. When two or more types of polyamide resins are contained, the total amount thereof preferably falls within the above range.

The liner of the present embodiment may contain a resin additive. Specific examples of the resin additive include additives such as coupling agents, reactive diluents, solvents, reactive diluents other than solvents, curing accelerators, humectants, tackifiers, antifoamers, delusterants, anticorrosives, lubricants, colorants, oxygen scavengers, ultraviolet absorbers, antioxidants (preferably phenolic antioxidants, more preferably hindered phenolic antioxidants), stabilizers (for example, phosphorus-based stabilizers), plasticizers, dispersants, flame retarders, antistatic agents, coloration inhibitors, and antigelling agents. The total amount of these is preferably 10 mass % or less of the resin.

The liner of the present embodiment may contain a filler. Examples of the filler include glass fibers, carbon fibers, talc, mica, glass beads, and glass flakes. The liner of the present embodiment may be configured to be substantially free of a filler. The expression "substantially free of a filler" means that the content of the filler is 10 mass % or less of the mass of the liner. The filler content is preferably 5 mass % or less, more preferably 3 mass % or less, and may be 1 mass % or less.

The liner of the present embodiment can be produced by a known method. For example, the liner can be molded by blow molding or injection molding.

Next, the pressure vessel of the present embodiment will be described. The pressure vessel of the present embodiment is characterized by including the liner of the present embodiment and an outer layer of the liner. The outer layer of the liner is a layer provided on an outer side of the liner in the pressure vessel, and may be composed of one layer or two or more layers. The number of the outer layers is preferably 1 to 4.

Figure 2:
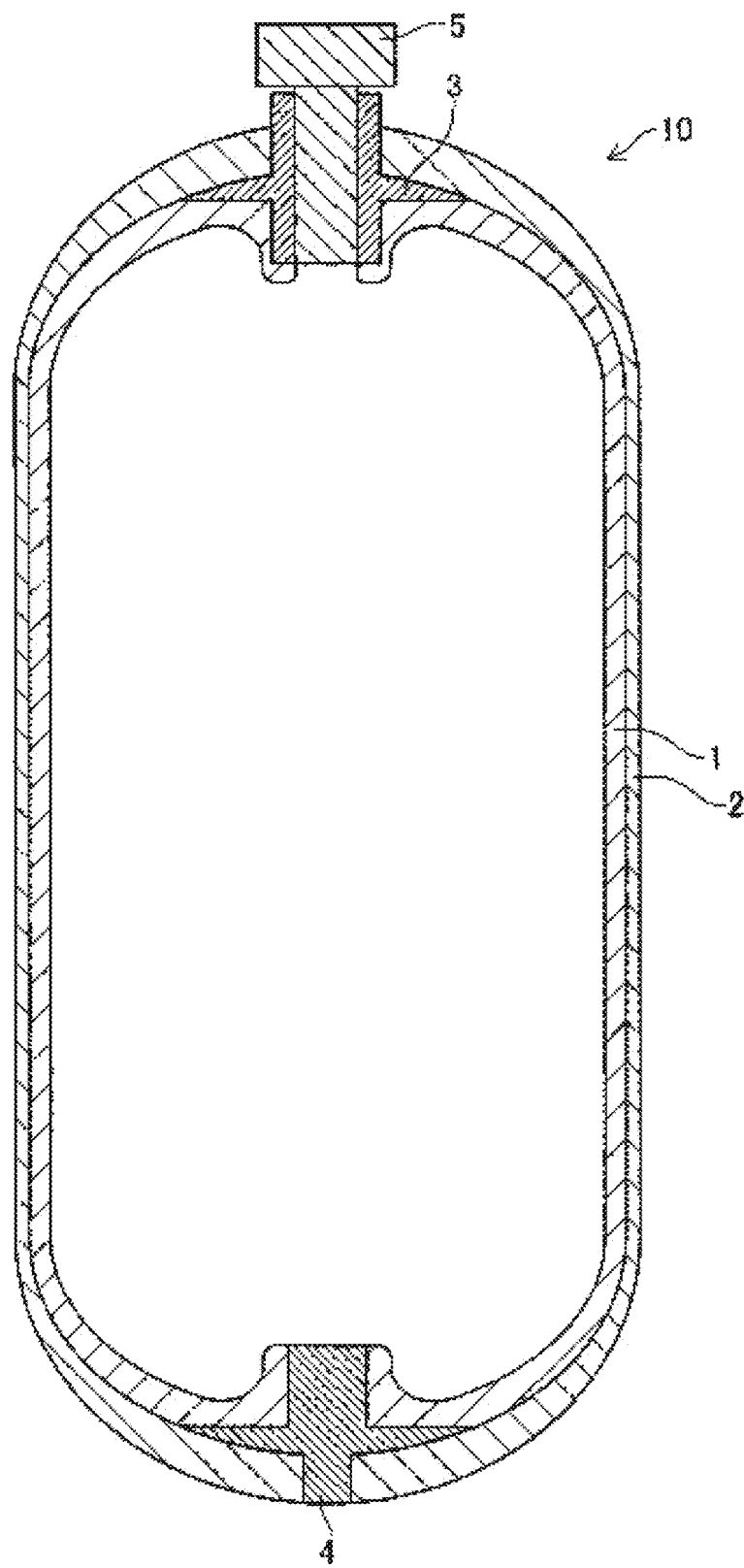
FIG. 2 is a cross-sectional schematic view of a pressure vessel of the present embodiment.
Figure 3:
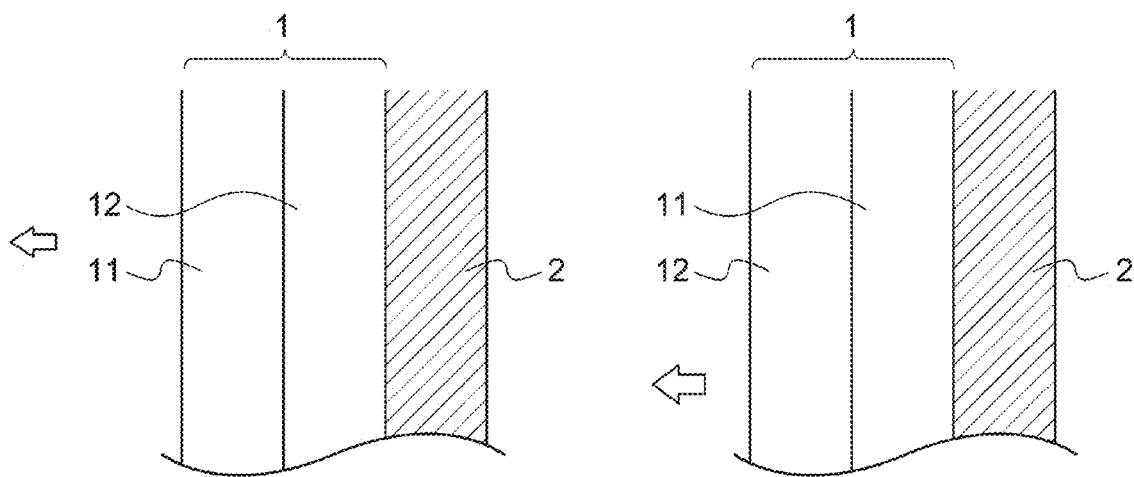
FIG. 3 is a cross-sectional schematic view illustrating a layer configuration of a body of the pressure vessel of the present embodiment.

FIG. 2 is a schematic view illustrating an example of the pressure vessel of the present embodiment, in which 1 denotes the liner of the present embodiment, 2 denotes an outer layer, 3 denotes a ferrule, 4 denotes a boss, and 5 denotes a valve. FIG. 3 is an enlarged view of a portion of a body of FIG. 2, and an arrow indicates the inner side of the body. Reference numerals in FIGS. 1 to 3 are common.

As illustrated in FIG. 3(a), the region (region 11) of the liner 1 in which the content of the toughness improver is from 5 to 20 mass % may be toward an inner side of the pressure vessel, or, as illustrated in FIG. 3(b), the region 11 may be toward an outer side of the pressure vessel. When the region 11 is toward the inner side, it is possible to effectively suppress expansion of a gap between the liner and the outer layer. Meanwhile, when the region 11 is toward the outer side, it is possible to suppress breakage of the pressure vessel. In the present embodiment, the region (region 11) where the content of the toughness improver is from 5 to 20 mass % is preferably toward the inner side of the pressure vessel. With such a configuration, the shape maintenance at the time of depressurization can be more effectively achieved.

The outer layer 2 is a layer formed so as to cover the outer periphery (at least the body) of the liner.

One embodiment of the outer layer 2 is a fiber-reinforced plastic layer. The fiber-reinforced plastic layer is preferably produced by winding a fiber-reinforced plastic (FRP) material around the outer periphery of the liner. In the pressure vessel of the present embodiment, an additional layer may be provided between the liner and the fiber-reinforced plastic layer, but the liner and the fiber-reinforced plastic layer are preferably adjacent to each other. As used herein, the term "adjacent" means that layers are adjacent to each other with no additional layer interposed therebetween, and does not mean that the adjacent layers are completely in close contact with each other. Furthermore, in the pressure vessel of the present embodiment, it is preferable that the outer layer which is the fiber-reinforced plastic layer be adjacent to the region (region 12) of the liner in which the content of the toughness improver is 0.5 mass % or less. The pressure vessel having such a configuration can more effectively exhibit the effects of the present invention.

The resin component constituting the fiber-reinforced plastic may be a thermoplastic resin, a thermosetting resin, or a mixture of both resins. In an example of an aspect of the resin component constituting the fiber-reinforced plastic, the resin component contains a thermoplastic resin, and 90 mass % or more of the resin component is preferably a thermoplastic resin. In another example of the aspect of the resin component, the resin component contains a thermosetting resin, and 90 mass % or more of the resin component is preferably a thermosetting resin.

The resin component constituting the fiber-reinforced plastic refers to a component other than reinforcing fibers, and contains a resin additive in addition to the resin.

Examples of the thermosetting resin include epoxy resins, phenolic resins, (meth)acrylate resins, unsaturated polyester resins, diallyl phthalate resins, cyanate resins, and maleimide resins, and epoxy resins are preferred.

Examples of the thermoplastic resin include polyolefin resins, polyethylene resins, polypropylene resins, polyamide resins, acrylonitrile-butadiene-styrene copolymer (ABS) resins, polybutylene terephthalate resins, polyacetal resins, and polycarbonate resins, and polyamide resins are preferred. The polyamide resin may be an aliphatic polyamide resin or a semi-aromatic polyamide resin, but is preferably a semi-aromatic polyamide resin, and more preferably a xylylenediamine-based polyamide resin.

In the present embodiment, the resin component constituting the fiber-reinforced plastic may contain an additional component (resin additive) without departing from the spirit of the present invention. Examples of the resin additive include additives such as flame retarders, coupling agents, reactive diluents, solvents, reactive diluents other than solvents, curing accelerators, humectants, tackifiers, antifoamers, delusterants, anticorrosives, lubricants, colorants, oxygen scavengers, ultraviolet absorbers, antioxidants, plasticizers, dispersants, flame retarders, antistatic agents, coloration inhibitors, and antigelling agents. The total amount of these is preferably 10 mass % or less of the total amount of the resin components constituting the fiber-reinforced plastic.

In the present embodiment, the fiber-reinforced plastic contains reinforcing fibers, and preferably contains continuous reinforcing fibers.

The continuous reinforcing fibers used in the outer layer of the present embodiment are preferably reinforcing fibers having a fiber length of more than 100 mm.

Examples of the form of the continuous reinforcing fibers include tow, yarn, filament, sheet, and tape, and the continuous reinforcing fibers constituting a sheet or tape include, for example, unidirectional (UD) materials, textiles, and non-woven fabrics.

Examples of materials of the reinforcing fibers include inorganic fibers, such as glass fibers, carbon fibers, metal fibers, boron fibers, basalt fibers, and ceramic fibers; and organic fibers, such as aramid fibers, polyoxymethylene fibers, aromatic polyamide fibers, polyparaphenylene benzobisoxazole fibers, and ultra-high molecular weight polyethylene fibers. Among these, inorganic fibers are preferred from the viewpoint of achieving high strength, at least one type selected from the group consisting of glass fibers, carbon fibers, and glass fibers is more preferred because of light weight, high strength, and high elastic modulus, and carbon fibers are even more preferred.

Examples of carbon fibers include polyacrylonitrile-based carbon fibers and pitch-based carbon fibers. In addition, a carbon fiber made from a plant-derived raw material, such as lignin or cellulose, can also be used.

The reinforcing fibers used in the present embodiment may be treated with a treatment agent. Examples of the treatment agent include a surface treatment agent or a sizing agent.

A silane coupling agent is preferred as the surface treatment agent. Examples of the silane coupling agent include a silane coupling agent having a vinyl group, a silane coupling agent having an amino group, a silane coupling agent having an epoxy group, a silane coupling agent having a (meth)acrylic group, and a silane coupling agent having a mercapto group.

Examples of the sizing agent include urethane-based sizing agents, epoxy-based sizing agents, acrylic-based sizing agents, polyester-based sizing agents, vinyl ester-based sizing agents, polyolefin-based sizing agents, polyether-based sizing agents, and carboxylic acid-based sizing agents. Of these, one type of sizing agent can be used, or two or more types of sizing agents can be used in combination. Examples of combinations of two or more sizing agents include urethane/epoxy-based sizing agents, urethane/acrylic-based sizing agents, and urethane/carboxylic acid-based sizing agents.

The amount of the treatment agent is preferably from 0.001 to 5 mass %, more preferably from 0.1 to 3 mass %, and even more preferably from 0.5 to 2 mass %, relative to the total amount of the reinforcing fibers.

Commercially available products can also be used as the reinforcing fibers. Examples of commercially available products of carbon fibers that are reinforcing fibers include Torayca yarn of the series "T300", "T300B", "T400HB", "T700SC", "T800SC", "T800HB", "T830HB", "T1000 GB", "T100GC", "M35JB", "M40JB", "M46JB", "M50JB", "M55J", "M55JB", "M60JB", "M30SC", and "Z600", and Torayca Cloth of the series "CO6142", "CO6151B", "CO6343", "CO6343B", "CO6347B", "CO6644B", "CK6244C", "CK6273C", and "CK6261C", the "UT70" series, the "UM46" series, and the "BT70" series, available from Toray Industries, Inc.

In the fiber-reinforced plastic in the present embodiment, the total amount of the resin component and the continuous reinforcing fibers is preferably 90 mass % or more, more preferably 95 mass % or more, and even more preferably 99 mass % or more, and the upper limit thereof is 100 mass %.

As the outer layer 2, a protective layer is exemplified in addition to the above-mentioned layers. Examples of the protective layer include a protective layer for heat insulation or cooling insulation, and a protective layer containing a paint or a rust inhibitor. When a multilayer vessel of the present embodiment includes a fiber-reinforced plastic layer and a protective layer as the outer layers, the protective layer is preferably an outer side layer.

The protective layer may be composed of only one layer or two or more layers.

Furthermore, as illustrated in FIG. 2, the pressure vessel of the present embodiment includes a ferrule 3, a boss 4, and a valve 5. Furthermore, the pressure vessel may include, as an extension of the body, dome parts that seal the body on the ferrule 3 side and on the boss 4 side of the body. The dome parts are typically formed of the same composition as that of the body (the liner 1 and the outer layer 2).

In addition, the pressure vessel may include a detachable part (not illustrated) for attachment/detachment with another member.

The pressure vessel of the present embodiment may have an inner layer of the liner 1 without departing from the spirit of the present embodiment.

Next, the production method of the pressure vessel will be described.

The pressure vessel of the present embodiment can be produced by a known method. In particular, the outer layer is molded using the fiber-reinforced plastic by a blading method, a winding method, or a 3D printing method. In this case, the fiber-reinforced plastic is preferably a material in which continuous reinforcing fibers are regularly arranged in one direction or two or more directions and the continuous reinforcing fibers are impregnated with a resin component. Representative examples of the material include prepregs.

The outer layer is typically formed by molding the fiber-reinforced plastic in such a manner that the continuous reinforcing fibers are present in a cylindrical form with substantially no gaps as described above.

The pressure vessel of the present embodiment can be suitably used as a high-pressure gas storage tank. The gas to be stored in the high-pressure gas storage tank may be any material that is in gaseous form at 25° C. and 1 atm, and examples of the gas include hydrogen, oxygen, carbon dioxide, nitrogen, argon, LPG, chlorofluorocarbon substitutes, and methane. Among these, the gas is preferably oxygen and hydrogen, and more preferably hydrogen.

The pressure vessel of the present embodiment has good gas barrier properties against hydrogen gas, as well as excellent lightweight properties, pressure resistance, and impact resistance.

In addition, without departing from the spirit of the present invention, the configuration and production of the pressure vessel may be made by referring to the description of JP 2020-133666 A, the description of JP 2020-101195 A, the description of JP 2018-189178 A, and the description of JP 09-280496 A, the contents of which are incorporated herein by reference.

EXAMPLES

The present invention will next be described in more detail with reference to Examples. Materials, amounts used, proportions, processing details, and processing procedures described in the following Examples can be appropriately changed without departing from the spirit of the present invention. Thus, the scope of the present invention is not limited to the specific examples described below.

When a measuring device used in the Examples is not readily available due to, for example, discontinuation, another device with equivalent performance can be used for measurement.

1. Raw Material

Polyamide 6: available from Unitika Ltd., M1040
MXD6: polyamide resin synthesized from m-xylylenediamine and adipic acid, available from Mitsubishi Gas Chemical Company, Inc., S6007
TAFMER MH5040: maleic anhydride-modified polyolefin, available from Mitsui Chemicals, Inc., acid modification rate 2.0 mass %
Irganox 1098: hindered phenolic antioxidant, available from BASF
Irgafos 168: phosphorus-based processing stabilizer, available from BASF
Sumilizer TP-D: phenolic antioxidant, available from Mitsui Chemicals, Inc.

In the present Examples, polyamide 6 may be referred to as PA6, and MXD6 blended with TAFMER may be referred to as MXD6+T.

Production of Liner-Forming Resin Composition

Into 85 parts by mass of the above MXD6, 15 parts by mass of TAFMER MH5040, 0.5 parts by mass of Irganox 1098, 0.2 parts by mass of Irgafos 168, and 0.2 parts by mass of Sumilizer TP-D were blended, and the blend was fed from the base of a twin-screw extruder (available from Shibaura Machine Co., Ltd., TEM26SS), and melt-kneaded to produce a liner-forming resin composition (MXD6+T). The temperature of the twin-screw extruder was set to 280° C.

2. Comparative Examples 1 to 4 and Examples 1 to 4 Production of Multilayer Body for Liner A multilayer blow molding machine having two extruders was used to produce a multilayer body for a liner composed of two layers (two regions), i.e., a layer a to be a region close to an outer layer of a pressure vessel and a layer b to be a region close to an inner side of the pressure vessel.

Specifically, the layers a and b were co-extruded at an extrusion temperature higher by 20° C. than the melting point of the polyamide resin contained in each of the layers, to produce a multilayer body having an overall thickness of 1500 μm.

In Comparative Example 1, however, a single layer having an overall thickness of 1500 μm was formed.

Hydrogen Barrier Property

The hydrogen barrier property of the produced multilayer body for a liner was measured in a thickness direction by a differential pressure method in accordance with ISO15106-5.

The measuring apparatus used was Deltaperm DP-UH2C (available from Technolox).

Values are shown relative to the value of Comparative Example 1 that is taken as 100%.

Evaluation was made as follows.
A: 65% or less
B: more than 65% and 75% or less
C: more than 75% and 90% or less
D: more than 90%

<Oxygen Barrier Property>

The oxygen barrier property of the produced multilayer body for a liner was measured in a thickness direction by an isopiestic method in accordance with ASTM D 3985. Oxygen gas is applied from the inner side.

The measuring apparatus used was OX-TRAN 2/61 (available from Mocon Inc.).

Values are shown relative to the value of Comparative Example 1 that is taken as 100%.

Evaluation was made as follows.
A: 20% or less
B: more than 20% and 40% or less
C: more than 40% and 60% or less
D: more than 60%

Pressure Resistance

The pressure resistance can also be regarded as the degree of expansion of the vessel due to gas filling, and the expansion causes a force acting in a tensile direction. Thus, the pressure resistance was evaluated by measuring the yield elongation of the multilayer body for a liner.

Specifically, the yield elongation of the produced multilayer body for a liner was measured in accordance with ISO527-1.

Values are shown relative to the value of Comparative Example 1 that is taken as 100%.

The pressure resistance is preferably 35% or more, and a higher value indicates better pressure resistance.

Shape Maintenance Rate During Depressurization

With regard to the shape maintenance rate during depressurization, when the inside of the liner is depressurized, a gas accumulated between the liner and the outer layer such as the fiber-reinforced plastic layer pushes the liner. The shape of the liner can be maintained when the elastic modulus of the liner itself is higher. Therefore, the shape maintenance rate was evaluated by measuring the tensile elastic modulus of the multilayer body for a liner.

Specifically, the tensile elastic modulus of the produced multilayer body for a liner was measured in accordance with ISO527-1.

Values are shown relative to the value of Comparative Example 1 that is taken as 100.

The shape maintenance rate is preferably as high as possible, and is preferably 110 or more.

TABLE 1

| Region near outer layer | Region near inner side | Comparative Example 1 | Comparative Example 2 | Comparative Example 3 | Comparative Example 4 | Example 1 | Example 2 | Example 3 | Example 4 |
|---|---|---|---|---|---|---|---|---|---|
| PA6 single layer | Single layer | | | | | | | | |
| MXD6 | PA6 | | | Outer:inner = 1:1 | | | | | |
| MXD6 | MXD6 | | | | | Outer:inner = 1:1 | | | |
| MXD6 + T | MXD6 + T | | | | | | | Outer:inner = 1:1 | |

TABLE 1-continued

| Region near outer layer | Region near inner side | Comparative Example 1 | Comparative Example 2 | Comparative Example 3 | Comparative Example 4 | Example 1 | Example 2 | Example 3 | Example 4 |
|---|---|---|---|---|---|---|---|---|---|
| MXD6 | MXD6 + T | | | | | | | Outer:inner = 1:1 | Outer:inner = 1:2 |
| MXD6 + T | MXD6 | | | | | Outer:inner = 1:1 | Outer:inner = 1:2 | | |
| Hydrogen barrier property (%) | | D | C | A | B | A | A | A | A |
| Oxygen barrier property (%) | | D | C | A | B | A | A | A | A |
| Pressure resistance (%) | | 100 | 66 | 32 | 52 | 35 | 39 | 42 | 46 |
| Shape maintenance rate (%) during depressurization | | 100 | 148 | 158 | 103 | 116 | 110 | 149 | 124 |

In Table 1 above, "outer:inner" indicates the thickness ratio of the outer region to the inner region of the liner.

As is clear from the above results, the liner of the present invention had high hydrogen barrier properties and high oxygen barrier properties, as well as high pressure resistance and a high shape maintenance rate during depressurization (Examples 1 to 4).

In contrast, when a single layer of polyamide 6 was used as the liner (Comparative Example 1), the gas barrier properties were poor. When MXD6 was used in the region close to the outer side of the liner in Comparative Example 1 (Comparative Example 2), the barrier properties were slightly improved but still insufficient. Meanwhile, when MXD6 was used in both the region close to the outer side and the region close to the inner side in Comparative Example 1 (Comparative Example 3), the gas barrier properties achieved sufficient values, but the pressure resistance was insufficient. When MXD6+T (toughness improver blended) was used in both the region close to the outer side and the region close to the inner side in Comparative Example 1 (Comparative Example 4), the barrier properties were improved but still insufficient, and the shape maintenance rate during depressurization was insufficient.

REFERENCE SIGNS LIST

1 Liner
2 Outer layer
3 Ferrule
4 Boss
5 Valve
10 Pressure vessel
11 Region in which content of toughness improver is from 5 to 20 mass %
12 Region in which content of toughness improver is 0.5 mass % or less
13 Optional region

The invention claimed is:

1. A liner comprising a polyamide resin, wherein
the polyamide resin contains a diamine-derived structural unit and a dicarboxylic acid-derived structural unit,
50 mol % or more of the diamine-derived structural unit is derived from a xylylenediamine,
a content of a toughness improver in a region up to 30% in a thickness direction from one surface of the liner is from 5 to 20 mass %, and
a content of a toughness improver in a region up to 30% in a thickness direction from the other surface of the liner is 0.5 mass % or less.

2. The liner according to claim 1, wherein 50 mol % or more of the dicarboxylic acid-derived structural unit is derived from an α,ω-linear aliphatic dicarboxylic acid having from 4 to 20 carbons.

3. The liner according to claim 2, wherein the toughness improver contains a carboxylic acid-modified polyolefin.

4. The liner according to claim 1, wherein the toughness improver contains a carboxylic acid-modified polyolefin.

5. The liner according to claim 4, wherein a carboxylic acid modification rate of the carboxylic acid-modified polyolefin is from 0.1 to 5.0 mass %.

6. A pressure vessel comprising the liner described in claim 1 and an outer layer of the liner.

7. The pressure vessel according to claim 6, wherein region of the liner in which the content of the toughness improver is from 5 to 20 mass % is provided at an inner side of the pressure vessel.

8. The pressure vessel according to claim 7, wherein the region of the liner in which the content of the toughness improver is from 5 to 20 mass % is provided at an outer side of the pressure vessel.

9. The pressure vessel according to claim 7, wherein the outer layer contains a fiber-reinforced plastic layer.

10. The pressure vessel according to claim 9,
wherein the region of the liner in which the content of the toughness improver is from 5 to 20 mass % is provided at an inner side of the pressure vessel;
the outer layer contains a fiber-reinforced plastic layer;
the fiber-reinforced plastic layer contains a thermosetting resin; and
the outer layer which is the fiber-reinforced plastic layer is adjacent to the region of the liner in which the content of the toughness improver is 0.5 mass % or less.

11. The pressure vessel according to claim 9,
wherein the region of the liner in which the content of the toughness improver is from 5 to 20 mass % is provided at an outer side of the pressure vessel;
the outer layer contains a fiber-reinforced plastic layer;
the fiber-reinforced plastic layer contains a thermosetting resin; and
the outer layer which is the fiber-reinforced plastic layer is adjacent to the region of the liner in which the content of the toughness improver is 0.5 mass % or less.

12. The pressure vessel according to claim 7, which is for a hydrogen gas.

13. The pressure vessel according to claim 7, which is for an oxygen gas.

14. The pressure vessel according to claim 6, wherein the region of the liner in which the content of the toughness improver is from 5 to 20 mass % is provided at an outer side of the pressure vessel.

15. The pressure vessel according to claim 6, wherein the outer layer contains a fiber-reinforced plastic layer.

16. The pressure vessel according to claim 15, wherein the fiber-reinforced plastic layer contains a thermosetting resin.

17. The pressure vessel according to claim 15, wherein the outer layer which is the fiber-reinforced plastic layer is adjacent to the region of the liner in which the content of the toughness improver is 0.5 mass % or less.

18. The pressure vessel according to claim 6, which is for a hydrogen gas.

19. The pressure vessel according to claim 6, which is for an oxygen gas.

* * * * *